(12) United States Patent
Lasley

(10) Patent No.: US 8,678,173 B2
(45) Date of Patent: Mar. 25, 2014

(54) MODIFIED PUSH BEAMS FOR HIGHWALL MINING

(76) Inventor: Tim Lasley, Pineville, KY (US)

(*) Notice: Subject to any disclaimer, the term of this patent is extended or adjusted under 35 U.S.C. 154(b) by 0 days.

(21) Appl. No.: 13/427,988

(22) Filed: Mar. 23, 2012

(65) Prior Publication Data

US 2013/0248328 A1    Sep. 26, 2013

(51) Int. Cl.
*B65G 65/22* (2006.01)

(52) U.S. Cl.
USPC .............................. 198/513; 198/522; 299/18

(58) Field of Classification Search
USPC ...................................... 299/18; 198/513, 522
See application file for complete search history.

(56) References Cited

U.S. PATENT DOCUMENTS

| | | | |
|---|---|---|---|
| 2,713,479 A * | 7/1955 | Wiebe | 299/68 |
| 2,753,971 A | 7/1956 | Ball | |
| 2,877,882 A * | 3/1959 | Fitzgerald | 198/513 |
| 2,885,054 A * | 5/1959 | Sibley et al. | 198/513 |
| 2,908,374 A * | 10/1959 | Russell | 198/513 |
| 3,417,851 A | 12/1968 | Gonski | |
| 3,456,984 A | 7/1969 | Lanfermann | |
| 3,516,712 A | 6/1970 | Bennett | |
| 3,620,345 A | 11/1971 | Gonski | |
| 3,642,325 A | 2/1972 | Mulvaney | |
| 3,712,679 A | 1/1973 | Amoroso | |
| 3,997,216 A * | 12/1976 | Russell | 299/57 |
| 4,014,574 A * | 3/1977 | Todd | 299/1.4 |
| 4,118,072 A | 10/1978 | Kelley | |
| 4,133,582 A | 1/1979 | Kogelmann | |
| 4,159,055 A | 6/1979 | Eberle | |
| 4,254,993 A | 3/1981 | McGee | |
| 4,262,964 A | 4/1981 | Ingle | |
| 4,288,125 A | 9/1981 | Ingle | |
| 4,441,761 A | 4/1984 | Fields | |
| 4,906,133 A | 3/1990 | Martin | |
| 4,952,000 A | 8/1990 | Lipinski | |
| 4,953,915 A * | 9/1990 | Jasser et al. | 299/18 |
| 5,232,269 A | 8/1993 | Addington | |
| 5,522,647 A | 6/1996 | Sartaine | |
| 5,692,807 A * | 12/1997 | Zimmerman | 299/67 |
| 5,795,032 A | 8/1998 | Zimmerman | |
| 5,810,447 A | 9/1998 | Christopher | |
| 5,863,101 A | 1/1999 | Seear | |
| 5,997,100 A | 12/1999 | Marshall | |
| 6,168,240 B1 | 1/2001 | Stickel | |
| 6,270,163 B1 | 8/2001 | Mullet | |
| 6,652,035 B2 | 11/2003 | Chisholm | |
| 7,717,522 B2 * | 5/2010 | Wilhelm in 't Hout et al. | 299/18 |
| 7,963,387 B2 * | 6/2011 | Carmody et al. | 198/513 |
| 8,104,607 B2 | 1/2012 | Webb | |
| 2007/0035173 A1 | 2/2007 | Mraz | |
| 2011/0062768 A1 | 3/2011 | Van Zyl | |

* cited by examiner

*Primary Examiner* — Ramya Burgess
*Assistant Examiner* — Thomas Randazzo
(74) *Attorney, Agent, or Firm* — Stockwell & Smedley, PSC

(57) ABSTRACT

The present invention provides modified push beams for insertion and use in a series of push beams or segments during highwall mining operations to capture residual coal or "fines" that might otherwise be left behind. A first modified beam or recovery beam is provided to divert residual coal on the floor of the mine to the sides, and/or a second modified beam captures the residual coal on the sides of the mine, which may include the coal diverted by the first modified beam, through a side entry system comprising side channel(s) with side auger(s) to combine this captured residual coal with the bulk flow of mined material in a main channel of the recovery beam that is continuous among the series of beams or segments. Methods are also provided for the operation of the modified beams and their insertion into the series of beams of a highwall miner.

33 Claims, 7 Drawing Sheets

MODIFIED PUSH BEAMS FOR HIGHWALL MINING

BACKGROUND

1. Field of the Invention

The present invention relates to a push beam for use in highwall mining operations for increased recovery of coal or other material from a generally horizontal mine.

2. Related Art

Mining methods for coal and other minerals can be divided into two types: underground mining and surface mining. Surface mining may include strip mining, open-pit mining and mountain top removal and generally involves removing layers of earth and bedrock to expose the coal, etc., for mining. However, these methods require removal of large amounts of earth (i.e., overburden), above a coal or mineral seam or deposit to reach it, especially at increasing depths. Thus, these methods eventually become uneconomic due to the amount of earth removal needed relative to the value of the mined coal, etc.

An excavated face of a hill or mountain is often created as a result of surface coal mining operations with coal seams or layers exposed on the face. However, continued strip mining or mountain top removal may no longer be feasible because of the amount of overburden above the seam that would need to be removed. Thus, a technique referred to as "highwall mining" was developed from auger mining as a way to mine these exposed horizontal coal seams without the need for expensive removal of the overburden.

Highwall mining generally involves making long rectangular drives by an unmanned continuous miner into the coal seam from the side of the highwall face. The continuous miner will generally have a rotating cutter head at its front end to cut into the coal seam as it is advanced and a gathering means at the front end to capture the coal mined by the cutter head and direct it to a set of conveyors or augers for transport out of the mine. To advance the cutter head into the seam, a series, train or string of conveyor segments (called "push beams") are inserted behind the cutter head one-by-one and pushed from behind by a powerhead located outside the mine. By inserting the series of push beams, highwall mining is able to advance the cutter head up to about 1000 feet (or 300 meters) into these seams to mine and retrieve coal. Multiple drives are performed in parallel to recover coal along the exposed seam. These parallel mines (or drives) are typically spaced apart a sufficient amount such that a pillar or rib of the seam is left in place between neighboring mines to support the weight of the overburden and keep it from collapsing. After mining is complete, the mines may also be filled with material to provide further support and reduce hazards.

Highwall mining is considered to be a more surgical operation and better for the environment than other surface mining techniques because much of the earth is left in place and undisturbed. However, while effective at removing coal from deep narrow mines, highwall miners do tend to leave residual amounts of coal cut from the mine (referred to as "fines") near the sides of the mine (i.e., between the push beam and the side or "rib" of the mine) as well as on the bottom of the mine. This residual coal is generally not captured by existing miners. The small amount of residual coal or fines left behind can be substantial in amount over the length of the mine hole. It is believed that about 60-120 tons of loose coal per mine (or about 8-30 tons per 100 feet of mine) is left behind typically by highwall mining. While this may amount to lost revenue due to its lack of recovery, it is currently challenging and not cost-effective to recover this coal. Because the mines are unsupported, maimed operations to recover it cannot be performed after highwall mining is complete.

Accordingly, there is a need in the art for a suitable and cost-effective apparatus and method for the recovery of this residual coal or fines that would otherwise be left behind by highwall mining.

SUMMARY

According to a first broad aspect of the present invention, a rectangular recovery beam for highwall mining is provided having a left side, a right side, a top, a bottom, a front end and a back end, comprising: a main channel spanning the full length of the recovery beam from the front end to the back end of the recovery beam and enclosed on its top and bottom, the main channel configured to receive two main augers oriented lengthwise inside the main channel; a left side channel, the left side channel being closer to the left side of the recovery beam than the main channel, the left side channel being enclosed on its top and bottom and at least partially separated from the main channel by a left partition wall, the left side channel configured to receive a left side auger oriented lengthwise inside the left side channel; a right side channel, the right side channel being closer to the right side of the recovery beam than the main channel, the right side channel being enclosed on its top and bottom and at least partially separated from the main channel by a right partition wall, the right side channel configured to receive a right side auger oriented lengthwise inside the right side channel; a left side opening in the left side of the recovery beam that is continuous with the left side channel; a right side opening in the right side of the recovery beam that is continuous with the right side channel; a left inner opening in the left side of the main channel between the left side channel and the main channel; and a right inner opening in the right side of the main channel between the right side channel and the main channel, ad wherein the rectangular recovery beam has its longest dimension from the front end to the back end, and wherein the recovery beam is mostly enclosed.

According to a second broad aspect of the present invention, a rectangular beam is provided for diverting coal to the sides of a mine during highwall mining having a left side, a right side, a top, a bottom, a front end and a back end, comprising: a main channel spanning the full length of the recovery beam from the front end to the back end of the recovery beam and enclosed on its top and bottom; a left main auger; a right main auger; and at least one V-shaped scraper on the underside of the recovery beam, wherein the left main auger and the right main auger are each oriented lengthwise inside the main channel and spanning at least most of the length of the main channel, wherein the at least one V-shaped scraper has a leading point, a left diverting side and a right diverting side, wherein the left diverting side is angled back toward the left side of the beam and the right diverting side is angled back toward the right side of the beam, wherein the portions of each of the left diverting beam and the right diverting beam closest to the left side and the right side of the beam are closer to the back of the beam than the leading point of the at least one V-shaped scraper, and wherein the rectangular recovery beam has its longest dimension from the front end to the back end, and wherein the recovery beam is mostly enclosed.

According to a third broad aspect of the present invention, a method for recovering additional coal during highwall mining, comprising: (a) providing a rectangular recovery beam for highwall mining having a left side, a right side, a top, a bottom, a front end and a back end, comprising: a main channel spanning the full length of the recovery beam from the front end to the back end of the recovery beam and enclosed on its top and bottom; at least two main augers including a left main auger and a right main auger, wherein the left main auger and the right main auger are each oriented lengthwise inside the main channel and spanning at least most of the length of the main channel; a left side channel, the left side channel being closer to the left side of the recovery beam than the main channel, the left side channel being enclosed on its top and bottom and at least partially separated from the main channel by a left partition wall; a left side auger oriented lengthwise inside the left side channel; a right side channel, the right side channel being closer to the right side of the recovery beam than the main channel, the right side channel being enclosed on its top and bottom and at least partially separated from the main channel by a right partition wall; a right side auger oriented lengthwise inside the right side channel; wherein the rectangular recovery beam has its longest dimension from the front end to the back end, and wherein the recovery beam is mostly enclosed; and wherein the left main auger and the left side augers are right-handed augers and the right main auger and the right side auger are left-handed augers; (b) rotating the left main auger and the right main auger, the main auger being rotated clockwise and the right main auger being rotated counter-clockwise; and (c) causing the left side auger and the right side auger to rotate by the left side auger being rotationally coupled to the left main auger and the right side auger being rotationally coupled to the right main auger.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1:
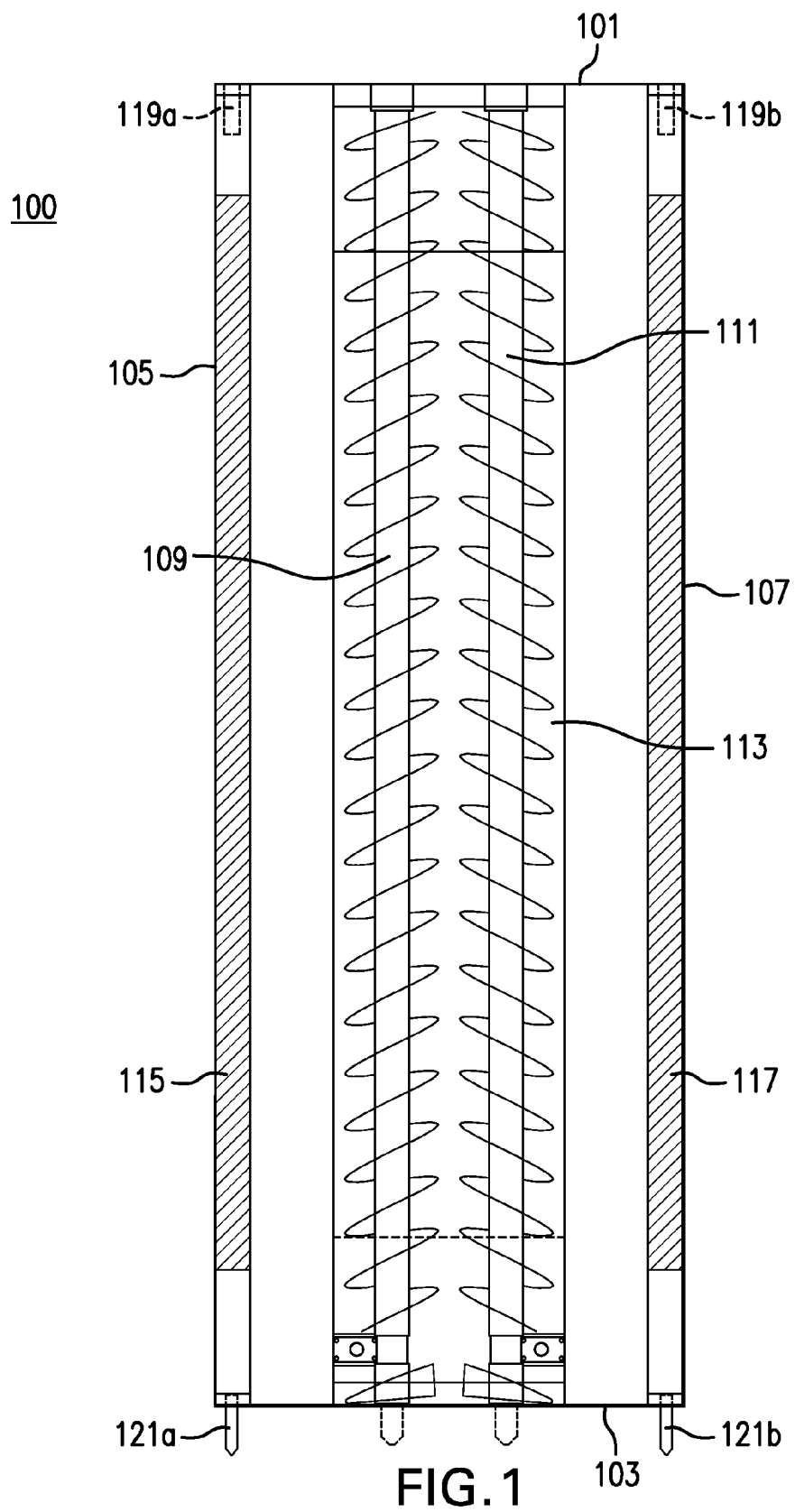
FIG. 1 is a top view of a conventional push beam for use in highwall mining with a top layer or panel removed for viewing inside the beam.

As stated above, highwall mining involves inserting individual push beams one-by-one behind the cutter head to advance the miner deeper into a coal seam. Each push beam in the series may generally be a rectangular and mostly enclosed metal "box" (having its longest dimension front to back) with a conveyor(s), such as two augers, disposed lengthwise therein and spanning at least most, nearly all or all of the length of the main channel, for directing the coal mined at the front end of the miner in a reverse direction out of the mine. The term "enclosed" refers to the beam, or a portion thereof, such as a channel, being covered or at least mostly covered on its sides, ends, top, bottom, etc. The term "lengthwise" as used herein refers to the direction or axis that is parallel, in line or at least substantially or approximately parallel with the longest dimension of the beam (i.e., parallel to the front-to-back axis of the beam). For purposes of the present invention, the terms "front," "back," "left," "right," "top" or "bottom" generally refer to the direction or side, end, edge, etc., of a portion of the beam, such as a channel, auger, opening, etc. (as the case may be), that is toward or closest to the front, back, left, right, top or bottom of the beam, respectively.

The outer walls and panels of each beam as well as its inner walls and partitions will generally be made of metal, such as steel, etc., to withstand the forces involved during operation. As shown in the example in FIG. 1, a beam 100 when viewed from the top may have a front end 101, a back end 103, a left side 105 and a right side 107 and may have a general bilateral symmetry. Two augers 109, 111 are disposed lengthwise in a central channel 113 with side portions 115, 117 being lateral to channel 113 (i.e., toward the sides relative to the channel 113). A front attaching portion 119a, 119b and a back attaching portion 121a, 121b are shown for secure and reversible attachment, connection, etc., to a complementary attaching portion on the neighboring push beam(s) and/or cutter head. By counter-rotation of the two augers 109, 111, the mined coal may be driven in a reverse direction (i.e., toward the back side 103 within each the beam 100).

The augers of each beam are generally located in a central channel(s) that are aligned in a continuous manner with the augers/channels of the neighboring push beam(s) and/or cutter head among the series of push beams (not shown), such that the bulk flow of mined material is carried out of the mine. As a result of the augers being enclosed inside the aligned channels of the series of push beams, the coal mined at the front of the miner generally matches what is transported out of the mine because the enclosed flow of mined coal is sequestered from any falling debris or rock that may occur over the length (i.e., depth) of the mine. Each push beam also has a means for attachment at the front and back ends for securely but reversibly attaching, connecting, interlocking, latching, etc., to a neighboring push beam(s) and/or cutter head segment directly in front of, and/or behind, the push beam. The phrases "directly in front" or "directly behind," for example, refer to immediately in front or immediately behind without intervening beams or segments.

The two augers in the central channel of a push beam may generally have flights with opposite "handedness," such that their counter-rotation will cooperate to cause coordinated movement or flow of coal in the same direction (i.e., rearward) out of the mine. For example, the left main auger (when viewed from the top) may be a right-handed auger, and the right main auger may be a left handed auger. The right-handed auger would have right-handed flights and be rotated clockwise, whereas the left-handed auger would have left-handed flights and be rotated counter-clockwise.

As the series of beams is elongated during highwall mining, neighboring push beam(s) and/or cutter head segment in the series will generally meet and attach at their respective front or back ends (i.e., the front end of one beam will generally meet the back end 103 of the beam or cutter head segment directly in front of it). The means for securely attaching or connecting the push beams together may be located on the front and back ends of the beam, such as on the front and back ends of side portions near the left and right sides of the beam, the left and right side portions being lateral to the central channel(s). The attachment means on the neighboring beam(s) and/or cutter head segment will each have corresponding front and back attaching portions having complementary structures for their secure connection together. These complementary attachments or structures function to reversibly but securely attach, connect, etc., the neighboring beam(s) and/or cutter head segment together. For example, FIG. 1 shows receiving cavities 119a, 119b and extensions 121a, 121b that may form part of the complementary attachments between neighboring beam(s) and/or cuter head segment. The extensions 121a, 121b on the back end 103 of beam 100 may insert into a receiving cavity on the front end of the beam behind it in the series, and receiving cavities 119a, 119b on the front end 101 of beam 100 may receive extensions on the beam or cutter head segment in front of it.

However, other complementary attachments between neighboring beams or segments are known in the art. See, e.g., U.S. Pat. No. 7,717,522, the entire contents and disclosure of which are hereby incorporated by reference. Indeed, the structures of the complementary extension and receiving cavity as well as any additional portions of the complementary attachments may vary and may include any pair(s) of complementary structures in the art for securely and reversibly attaching, connecting, etc., beams together.

Figure 2:
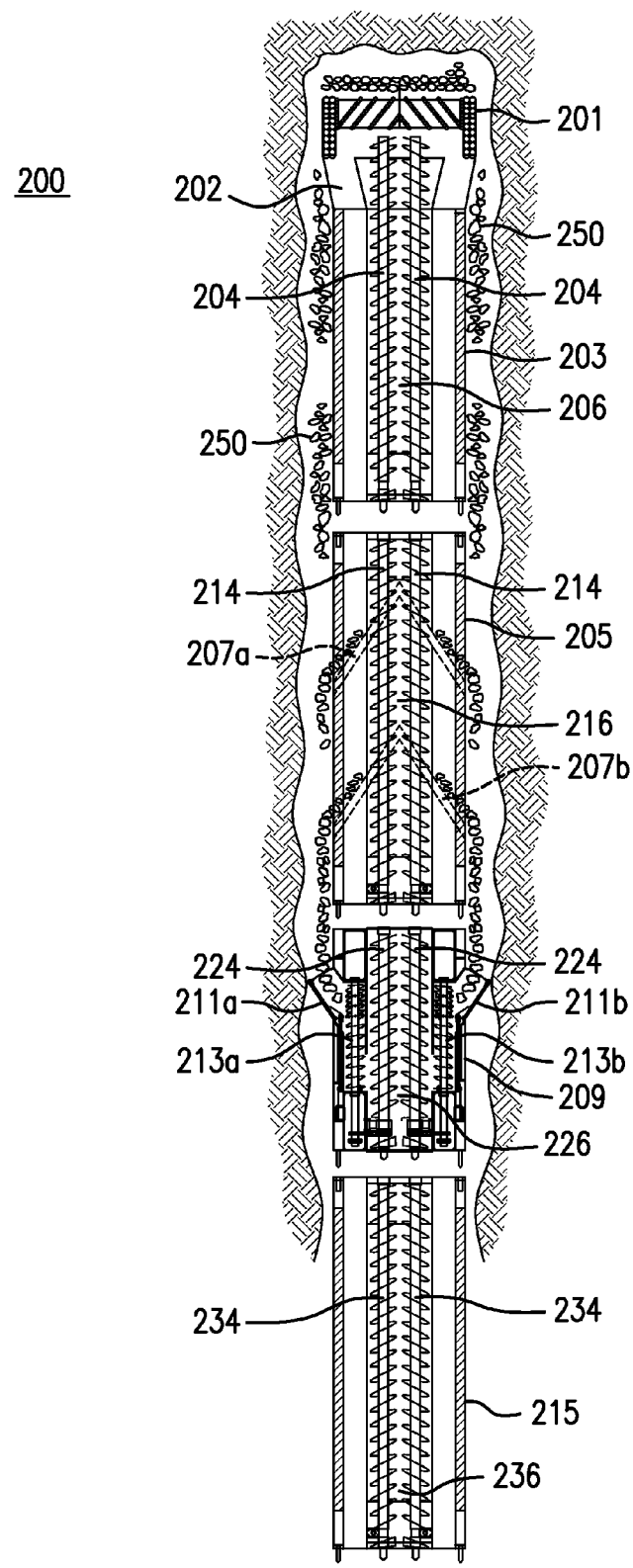
FIG. 2 is a top view of a series or train of push beams behind a cutter head advancing into a coal seam during highwall mining showing modified push beams of the present invention inserted in the series.

According to embodiments of the present invention, modified push beams are provided for use with existing high wall mining systems. These modified push beams are designed to capture the residual coal that is mined by the cutter head but missed by the gathering means near the front end of the miner. The advancement of the miner into the coal seam tends to push this residual coal or "fines" to the sides of the miner and push beams near the rib of the mine. Some of the residual coal is also crushed under the weight of the advancing beams. To capture this coal that would otherwise be left in the mine, two main concepts for a modified push beam are provided. As shown in FIG. 2, a series of push beams 200 as part of a highwall miner may include a first modified push beam 205 providing one or more V-shaped metal scrapers 207a, 207b on the underside of beam 205 to divert the residual coal under the beam to the sides of the mine.

As also shown in FIG. 2, a second modified push beam 209 (perhaps referred to as a "recovery beam") having side-entry projections or doors 211a, 211b is also provided for capturing the residual coal on the sides of the mine, which may include the residual coal that was diverted to the sides by the V-shaped scrapers 207a, 207b on the underside of the first modified beam 205. The residual coal will generally enter into two side channels (one on each side) of the second modified beam 209, each side channel having its own side or auxiliary auger 213a, 213b. This residual coal will enter each of the side channels through openings next to left side projection or door 211a and right projection or side door 211b, respectively, on each side of the modified beam 209. The side augers 213a, 213b may help to break up the coal entering the side channel and/or send this residual coal into the main channel 226 of the modified beam 209 with the main augers 224 disposed therein.

The series of beams 200 of the miner in FIG. 2 are shown with gaps or separation between each of them for purposes of illustration. However, the individual beams would actually be attached or connected at their front/back ends without these gaps during real operation. The front segment 203 is shown with a cutter head 201 attached at the front end of segment 203 and front gathering means 202, such as a scoop, pan, etc., to collect and divert the mined coal toward the central or main augers 204 in a central channel 206 of front segment 203. The front segment 203 associated with cutter head 201 and/or front gathering means 202 may be referred to as the cutter head beam or cutter head segment. The bulk of the mined coal is then carried rearward out of the mine by the aligned central augers 204, 214, 224, 234 in the central channels 206, 216, 226, 236 in each of the series of segments. The residual coal is captured by the second modified beam or recovery beam 209 through side openings next to side doors 211a, 211b and is directed into the side channels with side augers 213a, 213b and then into the main or central channel 226 with central augers 224 inside. The additional residual coal captured by the side entry system of the recovery beam 209 is thus combined with the bulk flow of mined coal in the main channel 226 and is carried out of the mine by the central or main augers 224, 234.

Both the first and second modified beams 205, 209 may preferably be positioned or inserted as near to the front of the series of beams or segments 200 of the miner as possible while achieving their purpose and function. Although the modified beams 205, 209 could be positioned or inserted anywhere in the series of beams 200, by positioning the modified beams 205, 209 near the front of the series of beams 200, a maximum amount of the residual coal can be captured by the recovery beam 209 during advancement of the series of beams 200 with only residual coal in front of the modified beams being unrecoverable because it is not encountered by recovery beam 209 once advancement of the series of beams 200 has ended. Obviously, if the first modified beam 205 with the V-shaped scraper(s) is used, it must be positioned in the series of beams 200 in front of the second modified beam 209 so that the second modified beam or recovery beam 209 can recover the coal diverted by the first modified beam 205. To have the recovery beam 209 located as far forward as possible in series 200, recovery beam 209 may generally be located directly behind the first modified beam 205 (if used) in the series 200, and the first modified beam 205 will be positioned directly behind the cutter head segment 203. If first modified beam 205 is not used, then recovery beam 209 may be positioned directly behind cutter head segment 203.

Figure 3:
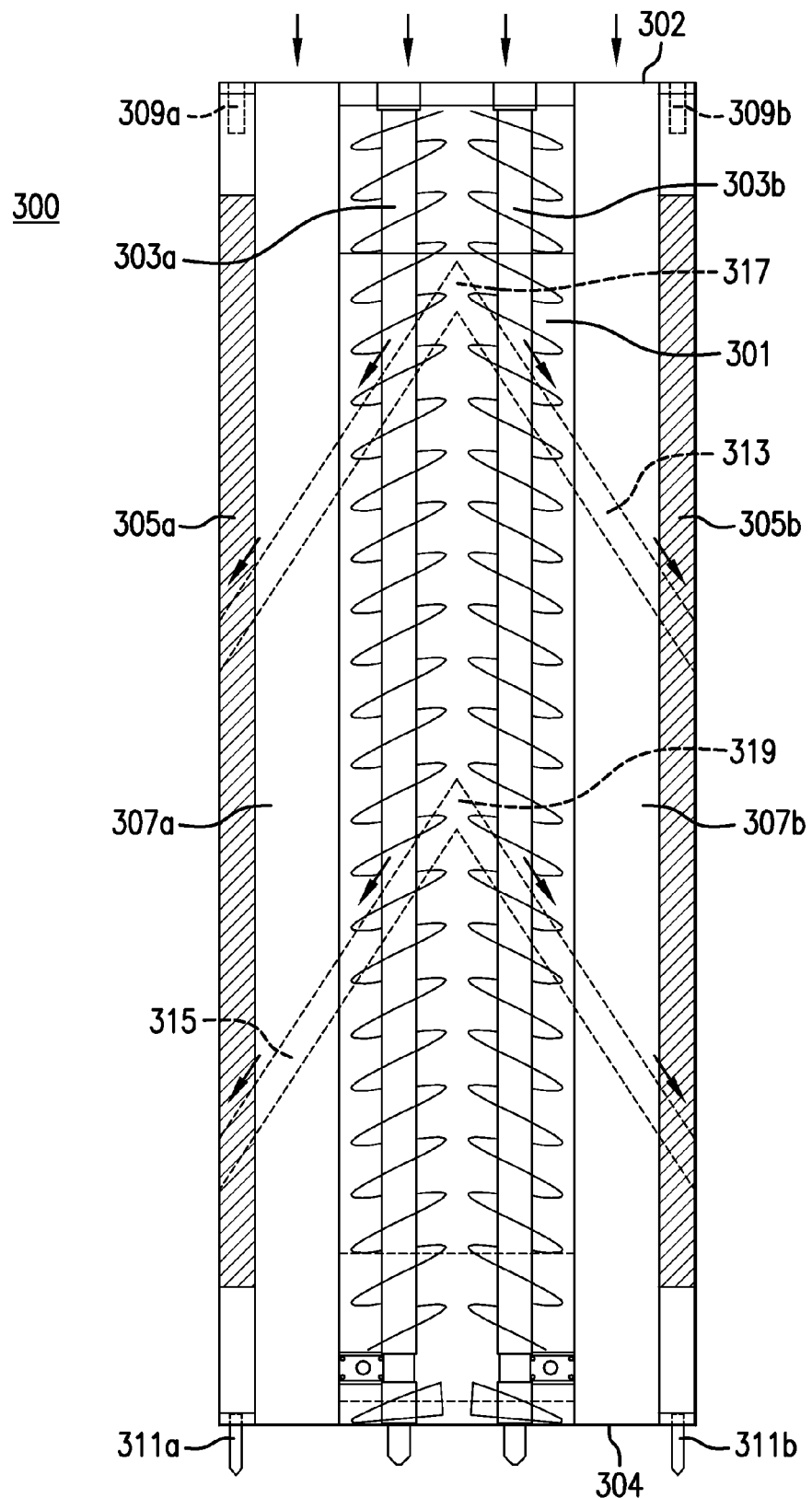
FIG. 3 is a top view of a first modified push beam of the present invention with the top layer or panel removed for viewing inside the beam.

According to one broad aspect of the present inventions, a modified push beam is provided with one or more V-shaped scrapers on the underside of the modified beam. For example, a modified push beam 300 is shown in FIG. 3 with a first scraper 313 and a second scraper 315 on the underside of beam 300, the first scraper 313 positioned further toward the front 302 of the modified beam 300 than the second scraper 315. Each scraper will generally be oriented to have the point 317, 319 of the "V" toward the front 302 of the beam 300, such that each V-shaped scraper 313, 315 has a first diverting side and a second diverting side that meet at their forwardmost position to form the point 317, 319 of the "V" near the longitudinal midline of the beam 300 with each diverting side angled rearward toward the respective sides of the beam 300. The diverting sides of each scraper 313, 315 will extend rearward at an angle toward a position on the sides of the beam that is further toward the back 304 of beam 300 than the point 317, 319 of each respective scraper 313, 315.

By advancement of the beam 300 as part of the series of beams of the highwall miner, each V-shaped scraper may divert the residual coal under the beam 300 to the sides of the beam 300 as indicated by arrows. Each scraper 313, 315 of the modified beam 300 will generally have a small thickness beneath the beam 300 in a range from about 0.25 inch to about 1.5 inches, or alternatively from about 0.5 inch to about 1.0 inch. The scrapers will generally have a consistent thickness along the length of each diverting side of the respective scraper. The small thickness dimension of each scraper may be sufficient to divert the residual coal under beam 300 to the sides of the beam 300 due in part to the large weight of the modified beam 300 along with its forceful forward advancement. The scraper may be bonded to the underside of the beam 300 by any suitable method, including soldering, etc. The scraper may also be formed or molded as part of the underside of the beam.

The angle at the leading or forward-most point 317, 319 of each scraper 313, 315 between the two diverting sides of each scraper may vary. However, the angle may generally be small enough to divert the coal while minimizing resistance caused by the scraper. On the other hand, the angle may be large enough to keep the distance between the leading point 317, 319 of each scraper 313, 315 and the position where each of the diverting sides of each scraper meets the side of the beam 300 from becoming too great. For example, the angle between the two diverting sides of each scraper may generally be less than 60°, or more preferably less than 45°, and potentially less than 30°.

Similar to existing beams, the modified beam 300 shown in FIG. 3 may have a central channel 301 with central or main augers 303a, 303b disposed lengthwise therein for alignment and movement with the central augers of adjacent or neighboring push beam(s) and/or cutter head segment (not shown). Thus, the modified beam 300 may be inserted into a series of push beams of a highwall miner much like existing beams. The modified beam 300 also has side portions 305a, 305b spanning the length of the beam on the left and right sides of the beam, respectively. The front and back ends 302, 304 of the modified beam 300 may include complementary attachment portions for secure and reversible attachment, connection, etc., of neighboring beam(s) and/or cutter head segment together for use.

As shown for example in FIG. 3, receiving cavities 309a, 309b are shown on beam 300 for receiving complementary extensions from a neighboring push beam or cutter head segment in front of the modified beam 300 in a series of beams. Extensions 311a, 311b are also shown on beam 300 for insertion into complementary receiving cavities of a neighboring push beam behind the beam 300 in the series of beams. Both the extensions 311a, 311b and receiving cavities 309a, 309b are shown in the side portions 305a, 305b of beam 300 near the sides of beam 300. The side portions 305a, 305b of the beam are spaced apart from the central channel 301 by intermediate spaces 307a, 307b. Complementary pairs of an extension and receiving cavity on neighboring beam(s) and/or cutter head segment may assist with attaching, connecting, etc., neighboring beam(s) and/or cutter head segment together during use. Each complementary pair of extension/receiving cavity may form part of an attachment mechanism that functions to reversibly but securely attach, connect, etc., the neighboring beam(s) and/or cutter head segment. As stated above, the structures of the complementary extension and receiving cavity as well as any additional portions of the attachment mechanism(s) can vary and may include any pair(s) of structures available in the art for attaching, connecting, etc., beams together.

Figure 4:
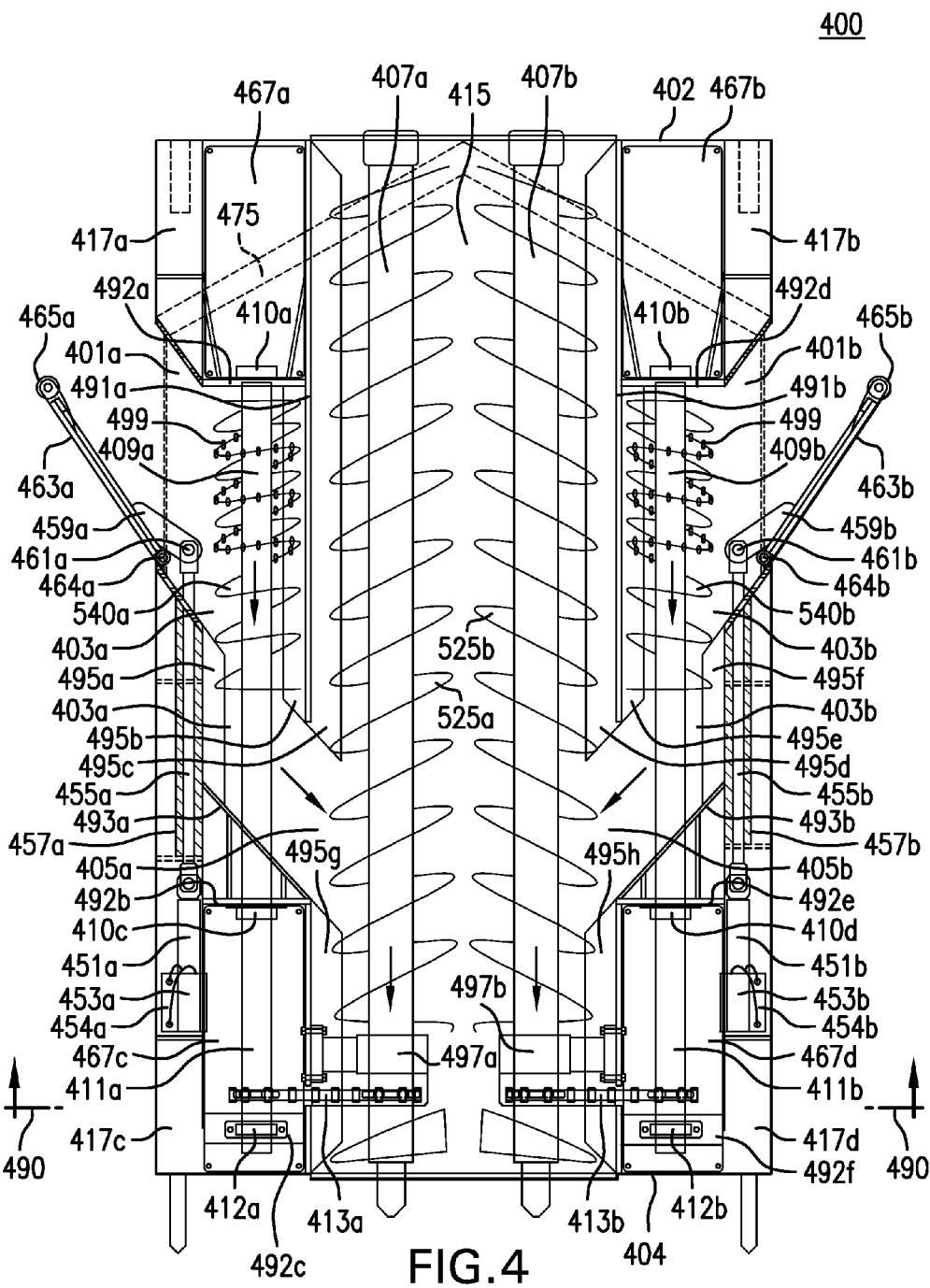
FIG. 4 is a top view of a second modified push beam (or recovery beam) of the present invention with the top layer or panel removed for viewing inside the beam and with side projections or doors in an open position.

According to another broad aspect of the present inventions, a modified push beam or recovery beam 400 is shown in FIG. 4 having a side entry system for capturing residual coal on the sides of the mine. According to these embodiments, this residual coal enters the side entry system through a first opening (or left side opening) 401a and a second opening (or right side opening) 401b on each side of modified beam 400. The additional residual coal then enters the respective side channels 403a, 403b and is directed into the main or central channel 415 as indicated by arrows. In this way, the residual coal on the sides of the mine may be captured and directed to the main channel 415 to join the bulk flow of coal out of the mine. The side channels 403a, 403b may be partially separated from the main channel 415 by partition walls 491a, 491b, respectively. Partition walls 491a, 491b may generally be continuous with the side walls of main channel 415 near the front 402 of beam 400 between main channel 415 and the left front intermediate space 467a and the right front intermediate space 467b, respectively.

However, inner openings 405a, 405b are formed between side channels 403a, 403b, respectively, and the main channel 415 where partition walls 491a, 491b are absent to allow the residual coal to flow from the side channels 403a, 403b into the main channel 415. The main channel 415 is bounded and enclosed by its side walls in addition to the partition walls 491a, 491b. The main channel 415 may also be enclosed on its top and bottom. Each side channel 403 may be defined as the space or channel between the respective side opening 401 and the respective inner opening 405. Each side channel 403 may be bounded by its side wall(s) (e.g., between the side channel 403 and a respective side portion 417) as well as by its respective partition wall 491. Each side channel 403 may also be bounded on its front end by its respective front plate 492a, 492d and on its back end by its respective angled panel 493 (see below). Each side channel 403 may also be enclosed on its top and bottom. In terms of relative positioning, the left inner opening 405a may be closer to the back 404 of the recovery beam 400 than the left side opening 401a, and the right inner opening 405b may be closer to the back 404 of the recovery beam 400 than the right side opening 401b.

According to some embodiments, recovery beam 400 may optionally include a V-shaped scraper 475 near the front and on the underside of the beam 400. Similar in concept to the scrapers described above in reference to FIG. 3, the V-shaped scraper 475 may have its leading point at or near the front end of the beam with trailing diverting sides angled back toward the sides of the beam 400 at or near the front or forward-most side of respective side openings 401a, 401b. However, the angle between diverting sides of scraper 475 may be wider than described in FIG. 3. Thus, according to these embodiments, any residual coal on the underside of beam 400 encountered by V-shaped scraper 475 may be diverted to the sides of beam 400 near the openings 401a, 401b so that it may then be captured by the side entry system of beam 400 and diverted into the respective side channel 403 of beam 400.

According to the embodiments in FIG. 4, the central or main augers 407a, 407b in the main channel 415 of modified beam 400 may generally be as described above for any conventional push beam, such as the example in FIG. 1, or the other modified beam 300 in FIG. 3, except as modified by the side entry system or otherwise. The attachment portions or structures on the front and back sides of beam 400 for secure and reversible attachment, connection, etc., of beam 400 to a neighboring beam(s) and/or cutter head segment having complementary attachment portions or structures may be as described above and may include any attachment types known in the art. For example, as shown in FIG. 4, the attachment portions on the front end 402 and back end 404 of beam 400 may include receiving cavities in front side portions 417a, 417b and extensions on rear side portions 417c, 417d.

To help push or advance the residual coal from the side of the mine through the side channels 403a, 403b and into the main channel 415, a left side auger 409a and a right side auger 409b may be disposed lengthwise in the left side channel 403a and the right side channel 403b, respectively, which may generally be in parallel with the main augers 407a, 407b.

Rotation of the two side augers 409a, 409b may be powered and driven by two chain drives 413a, 413b separately coupled with the main augers. A first chain drive is wrapped around one of the side augers and a respective main auger (i.e., the closest main auger), and the other chain drive is wrapped around the other side auger and its respective main auger.

As shown in FIG. 4, a first chain drive 413a engages the left main auger 407a and the left side auger 409a such that rotation of the left main auger 407a is transmitted to cause rotation of the left side auger 409a in the same rotational direction (i.e., clockwise if the left main auger 407a is rotating clockwise). Likewise, a second chain drive 413b engages the right main auger 407b and the right side auger 409b such that rotation of the right main auger 407b is transmitted to cause rotation of the right side auger 409b in the same rotational direction (i.e., counter-clockwise if the right main auger 407b is rotating counter-clockwise). The portions of both the first drive chain 413a and the second drive chain 413b extending into the main channel 415 may be sealed in a compartment to sequester and protect the drive chains 413a, 413b from the coal and debris traveling in the main channel 415. The portions of both the first drive chain 413a and the second drive chain 413b extending toward the respective side augers 409a, 409b may be within a left rear intermediate space 467c and a right rear intermediate space 467d, respectively.

Accordingly, to help direct the coal entering the side channel 403a, 403b through the respective openings 401a, 401b rearward and into the main channel 415, the threads or flights 540a, 540b of each side auger 409a, 409b will have the same "handedness" as its corresponding and co-rotational main auger 407a, 407b paired by the respective drive chain 413a, 413b. Thus, the left side auger 409a will be a right-handed auger if the left main auger 407a is right-handed, whereas the right side auger 409b will be a left-handed auger if the right main auger 407b is left-handed. This will cause each side auger to push the coal in the same direction (i.e., rearward) as its respective main auger. Because each side auger will generally have the same handedness and direction of rotation as its respective main auger, the handedness and direction of rotation of the two side augers will generally be the opposite because the handedness and direction of rotation of the two main augers are opposite.

Each of the side augers 409a, 409b will comprise a tube or shaft 411a, 411b and threads or flights 540a, 540b on the shaft. However, the threads or flights of each side auger 409a, 409b may occupy only a portion of the length of the respective side channel 403a, 403b. The portion of each side channel 403a, 403b not occupied by the flights 540a, 540b of the respective side auger 409a, 409b may include a portion of the respective side auger 409a, 409b having a bare shaft 411a, 411b without the flights. In general, the portion of each side channel 403a, 403b occupied by the flights 540a, 540b of the respective side auger 409a, 409b will include the portion of the side channel 403a, 403b that is closest to the front 402 of beam 400, whereas the portion of each side channel 403a, 403b that may not be occupied by the flights of the respective side auger 409a, 409b will be the portion of the side channel 403a, 403b closest to the back 404 of beam 400 and/or near or nearest the respective inner openings 405a, 405b.

The portion of each of the side channels 403a, 403b occupied by the flights of the respective side auger 409a, 409b may generally begin at or near the forward-most portion of the side channels 403a, 403b (i.e., nearest the front 402 of the beam) and extend rearward (i.e., toward the back 404) a distance or length. The portion of each of the side channels 403a, 403b occupied by the flights of the respective side auger 409a, 409b may generally be most of the length of the side channel 403a, 403b and/or most or all of the length of the portion of the side channel 403a, 403b bounded by the respective partition wall 491a, 491b. As used herein, the terms "most" or "mostly" refer to at least greater than half. The portion of each of the side channels 403a, 403b occupied by the flights of the respective side auger 409a, 409b may also be greater in length than the portion of the side channel 403a, 403b bounded by the respective partition wall 491a, 491b. In general, the lengths of the portions of each of the side channels 403a, 403b occupied by the flights of the respective side augers 409a, 409b may generally be about the same; however, it is also contemplated that they may be different to some extent.

Figure 5:
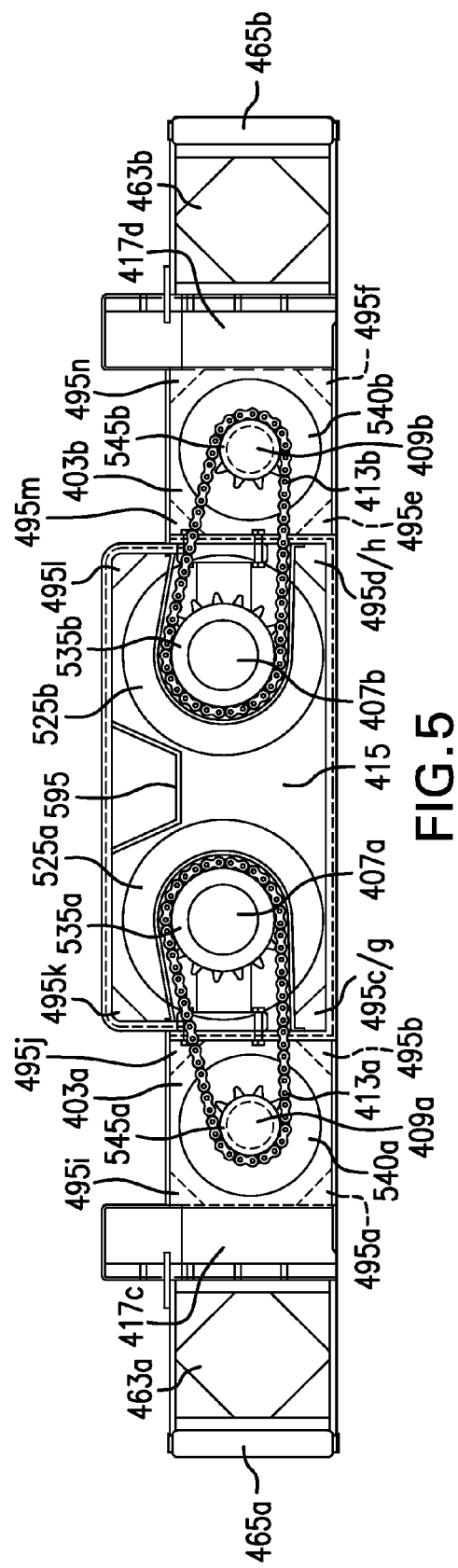
FIG. 5 is a cross-sectional view through second modified beam viewed from the back of the beam with side projections or doors in an open position.

As may be more clearly visualized in FIG. 5, the recovery beam as shown for example as beam 400 in FIGS. 4 and 5 may also include sloped portions (or sloped pieces) 495a-n in the corners on the sides of the main channel 415 and/or the side channel(s) 409a, 409b and spanning most, all or a portion of the length of the respective main channel 415 and/or side channel(s) 409a, 409b. In addition, a confining portion 595 (see FIG. 5) is disposed lengthwise in the main channel 415 spanning some, most or all of the length of the main channel along a midline of beam 400 between the two main augers 407a, 407b that extends downward from the top of the main channel 415.

These sloped portions 495a-n of the channels and/or the confining portion 595 may each confine the area of the channels around the flights 525a, 525b of the main augers 407a, 407b and/or the flights 540a, 540b of the side augers 409a, 409b (see FIG. 5) to assist these augers in driving the movement of the coal through the respective channels. Otherwise, the coal may have a tendency to get pushed to the sides by the mechanical action of the augers and/or pool near the sides of the channels by escaping the action of the main and side augers. Each of the side channels 403a, 403b may include an angled panel 493a, 493b bounding the back of the respective side channel 403a, 403b for helping to divert the coal moving rearward toward the back of the respective side channel 403a, 403b into the main channel 415 to join the bulk flow of mined material. Angled panels 493a, 493b will generally be disposed or positioned such that the side of the angled panel 493a, 493b closer to the side of beam 400 is closer to the front 402, whereas the side of the angled panel closer to the main channel 415 and the respective inner opening 405a, 405b is closer to the back 404 of the beam 400. These angled panels 493a, 493b will aid the flow of coal through recovery beam and avoid unwanted pooling on the sides and in the corners of the beam.

In addition to gathering the residual coal from the sides of the mine, the side augers 409a, 409b may also function to break up larger chunks of coal or other material entering the respective side channels 403a, 403b to help avoid any blockages in the recovery beam 400 or downstream and/or make the residual coal entering the main channel from each of the side channels more uniform, even, homogeneous, etc., and composed of smaller pieces. This function of breaking up the coal entering the side channels 403a, 403b may be further aided by increasing the density of flights on the side auger(s) 409a, 409b, especially in the forward or front portion of the respective side channel 403a, 403b and/or near the respective openings 401a, 401b into the side channels 403a, 403b. According to some embodiments, the density of flights of each side auger may be greater than, or about double the density compared to, the flight density at another portion or position of the side channel further toward the back of the side channel. For purposes of the present invention, the term "density" for auger flights means refers to how closely spaced are the flights of the auger. In other words, flight density is inversely related to pitch or the distance between neighboring or adjacent flights (e.g., a flight density that is about double will have a pitch or distance between adjacent flights that is about half). Furthermore, the flights on one or both of the side augers 409a, 409b may have teeth or bulges 499 to help break up the coal.

The side augers may be firmly and securely attached to the recovery beam in a number of different ways. For example, as shown in FIG. 4, a first end of the shaft 411a of the left side auger 409a may be held in place by insertion through a left front plate 492a and secured by a sealed flange bearing 410a on the front side of left front plate 492a, and a second end of the shaft 411a of the left side auger 409a may be held in place by attachment to a rear support 492c and secured by a pillar block bearing 412a. The left side auger 409a may be further held in place by insertion through a left rear plate 492b and secured by a sealed flange bearing 410c on the back side of left rear plate 492b. To accommodate the insertion of the shaft 411a of left side auger 409a through each of left front plate 492a, left rear plate 492b and perhaps angled panel 493a (forming back side of left side channel 403a), each of the left front plate 492a, left rear plate 492b and angled panel 493a may have a hole formed therein for receiving the insertion of the left side auger 409a. According to these embodiments, the left front plate 492a may be positioned between left side channel 403a and left front intermediate space 467a, and the left rear plate 492b may be positioned between left side channel 403a and left rear intermediate space 467c, although there may be a gap or space between the left side channel 403a and left rear intermediate space 467c (i.e., between left angled panel 493a and left rear plate 492b).

As further shown in the example of FIG. 4, right side auger may be similarly attached. Accordingly, a first end of the shaft 411b of the right side auger 409b may be held in place by insertion through a right front plate 492d and secured by a sealed flange bearing 410b on the front side of right front plate 492d, and a second end of the shaft 411b of the right side auger 409b may be held in place by attachment to a rear support 492f and secured by a pillar block bearing 412b. The right side auger 409b may be further held in place by insertion through a right rear plate 492e and secured by a sealed flange bearing 410d on the back side of right rear plate 492e. To accommodate the insertion of the shaft 411b of right side auger 409b through each of right front plate 492d, right rear plate 492e and perhaps angled panel 493b (forming back side of right side channel 403b), each of the right front plate 492d, right rear plate 492e and angled panel 493b may have a hole formed therein for receiving the insertion of the right side auger 409b. According to these embodiments, the right front plate 492d may be positioned between right side channel 403b and right front intermediate space 467b, and the right rear plate 492e may be positioned between right side channel 403b and right rear intermediate space 467d, although there may be a gap or space between the right side channel 403b and right rear intermediate space 467d (i.e., between right angled panel 493b and right rear plate 492e).

With the recovery beam in FIG. 4, the left front plate 492a and left rear plate 492b will be in a plane perpendicular to the longitudinal, major or rotational axis of the left side auger 409a. Likewise, the right front plate 492d and right rear plate 492e will be in a plane perpendicular to the longitudinal, major or rotational axis of the right side auger 409b. Furthermore, left front plate 492a, left rear plate 492b, right front plate 492d and/or right rear plate 492e may also be parallel with the front end 402 and/or back end 404 of beam 400. An optional access panel may be placed over the top of the left front intermediate space 467a, right front intermediate space 467b, left rear intermediate space 467c and/or right rear intermediate space 467d.

For secure positioning of the main augers 407a, 407b coupled by respective drive chains 413a, 413b to corresponding side augers 409a, 409b, additional lateral supports 497a, 497b may be attached to their respective main augers 407a, 407b and perpendicularly to a closest side wall of the main channel 415 near the back of beam 400 and/or near coupling of drive chain 413a, 413b to respective main auger 407a, 407b. Lateral supports 497a, 497b will help withstand uneven forces encountered by side augers that might affect the alignment of, or strain on, the corresponding main augers and drive chains. A first lateral support 497a may be secured to the left main auger 407a at a first end of the first lateral support 497a and attached to the side wall of the main channel 415 at a position closest to the left main auger 407a on a second end of the first lateral support 497a. Likewise, a second lateral support 497b may be secured to the right main auger 407b on a first end of the second lateral support 497b and attached to the side wall of the main channel 415 at a position closest to the right main auger 407b on a second end of the second lateral support 497b.

According to some embodiments of the present invention, the recovery beam may also include elongated diverting projections or doors near each of the side openings on the sides of the beam extending, protruding or jutting out at a forward angle from an attachment or connection at or near the rear of the side openings. The term "forward angle" refers to an angle between the diverting projection or door and the respective side of the beam that places the distal end of the diverting projection or door closer to the front of the beam than if the diverting projection or door were perpendicular to the respective side of the beam. In other words, a "forward angle" is an the angle between the diverting projection or door and a line from the back of the respective side opening and the respective front corner of the beam that is less than 90° (the "respective front corner" of beam is the left front corner of beam if referring to left diverting projection or door and the right front corner of beam if right diverting projection or door). Because these diverting projections or doors are angled forward when in an open position (if hinged), they may function to divert or funnel residual coal on the sides of the mine through side openings and into side channels of recovery beam.

Although the diverting projection may be any shape suitable for diverting or funneling the residual coal on the sides of the mine into the respective side channel, the diverting projection may resemble a door or vertical plate as depicted in FIGS. 4-7. For example, as shown in FIG. 4, a left diverting projection or door 463a may be connected or attached at its proximal side, edge or end to beam 400 by a hinge 464a located at or near the back side of opening 401a (and at or near left side of beam 400), such that a distal side, edge or end of the left diverting projection or door 463a is able to swing open away from the front side of opening 401a while the proximal side, edge or end remains connected or attached by hinge 464a at or near the back side of opening 401a until a desired angle between the left diverting projection or door 463a and the left side of beam 400 is reached, such as at an angle of about 45° or less.

Much like the left diverting projection or door, a right diverting projection 463b is also shown in FIG. 4 that may be connected or attached at a proximal side, edge or end to beam 400 by a hinge 464b located at or near the back side of opening 401b (at or near right side of beam 400), such that a distal side, edge or end of the right diverting projection or door 463b is able to swing open away from the front side of opening 401*b* while the proximal side, edge or end remains connected or attached by hinge 464*b* at or near the back side of opening 401*b* until a desired angle between the right diverting projection or door 463*b* and the right side of beam 400 is reached, such as at an angle of about 45° or less Although each diverting projection or door 463 is depicted as being approximately flat or planar and perpendicular with the ground, additional structures, such as scoops, cutting edges, etc., may be added to the diverting projection or door (not shown) and/or different shapes of the diverting projection or door (not shown) may be used to assist in lifting, diverting and/or funneling of residual coal from the sides of the mine into the side channels 403. The cross-sectional size and shape of mines are generally about the same with typical cutter heads of highwall miners in use today. Thus, the length or distance of each diverting projection or door extending from its attachment or connection to the beam (i.e., the distance from the proximal end to the distal end of the diverting projection or door) and/or its angle with the side of the beam (when open if hinged) may be predetermined such that the lateral side, edge or end of the diverting projection or door is closely spaced from the side or rib of the mine during use.

The diverting projection or door 463 of the present invention may also have a long wheel 465 along its lateral side, edge or end. For example, left diverting projection or door 463*a* may have wheeled edge or end 465*a* at its lateral side, edge or end, and right diverting projection or door 463*b* may have wheeled edge or end 465*b* at its lateral side, edge or end. The lateral wheeled edge or end 465 of each diverting projection or door 463 may be used to rollingly engage the side or rib of the mine when pushed or extended backward due to the force and pressure of the residual coal contacting the diverting projection or door 463 during advancement of the miner. Since the diverting projection or door 463 is angled forward (when in an open position if hinged), additional strength and leverage may be imparted to the diverting projection or door 463 as a result of the wheeled edge or end 465 of each diverting projection or door 463 engaging, resting and/or rolling against the side or rib of the mine. This additional strength or leverage may help to forcefully divert or funnel the residual coal into the respective side channel 403 of the recovery beam 400. Despite having a rolling or wheeled edge or end 465, the diverting projection or door 463 may still get hung up or stuck against an obstacle in the mine during advancement of the miner. Therefore, the diverting projection or door 463 may be further designed or configured to break away or release when too much pressure, force or resistance is encountered to avoid disruption and/or misalignment of the series of beams and allow the primary mining operations and coal gathering at the front end of the miner to continue if such an event occurs.

According to some embodiments, the length of the diverting projection or door 463 may be about the same as, or slightly less than, the length of the respective opening 401 to allow the diverting projection or door 463 to sit within respective opening and/or become flush, recessed, or at least nearly flush with the respective side of the beam 400 when in a closed position. It may be necessary for the diverting projection or door 463 to be in a closed position due to spatial constraints of existing highwall machinery (e.g., the push beam transfer mechanism or PTM that would load or add the recovery beams at the back of the miner). The diverting projection or door 463 of the recovery beam 400 may remain in a closed position until it departs this machinery and/or is deployed into the mine. In other words, if the diverting projection or door 463 were in an open position, it may interfere or cause the recovery beam to not fit with existing machinery.

The size of a typical push beam or segment may vary somewhat but may be about 140 inches in length (front to back) and about 82 to about 83 inches, or about 82.5 inches, in width (left to right). In addition, the maximum height of the beam may vary, but may be about 18 inches to about 22 inches, or about 18.5 or about 20 inches. According to embodiments of the present invention, the length (i.e., distance front to back) of the side openings 401 on the sides of the beam 400 may be about 30 to about 34 inches, or about 32 inches, and the length of the diverting projection or door 463 (i.e., distance front to back when closed) may be a little less than the length of the respective side opening 401 to allow for it to fit flush within respective side opening 401 (see, e.g., FIG. 6). According to some of these example dimensions, when viewed from either the front or back end of the beam 400, each diverting projection or door 463 may project out from the respective side of the beam 400 (i.e., in the left-right dimension) about 16 inches when open during use.

Figure 6:
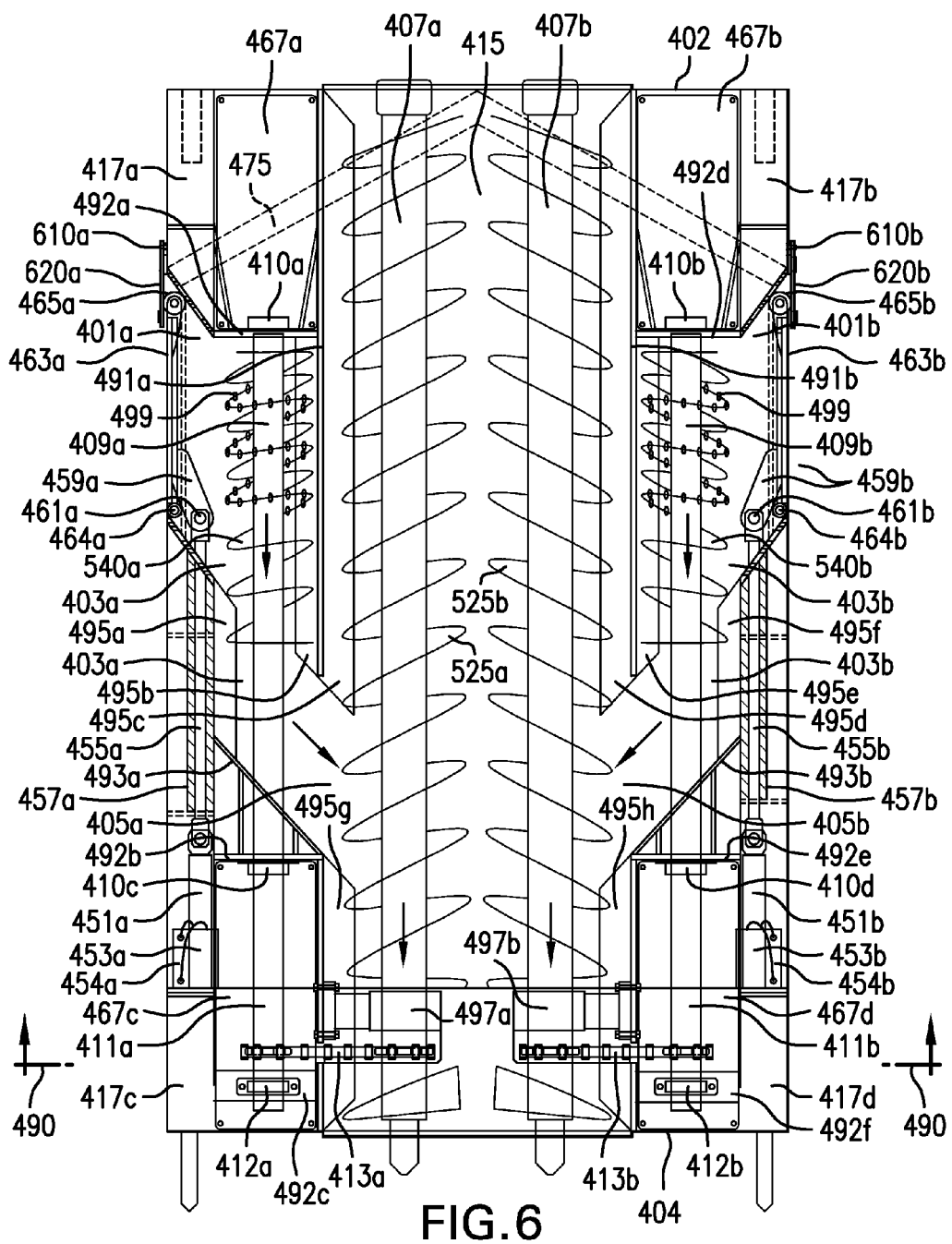
FIG. 6 is a top view of second modified push beam (or recovery beam) of the present invention with the top layer or panel removed for viewing inside the beam and with side projections or doors in a closed position.

FIG. 4 shows the diverting projections or doors 463*a*, 463*b* on each side of the beam 400 in an open position, whereas FIG. 6 shows these diverting projections or doors 463*a*, 463*b* on each side of the beam 400 in a closed position. To drive, power and/or control the opening and closing of the two diverting projections or doors on each side of a recovery beam, actuators may be used that are functionally coupled to these projections or doors 463. According to the embodiment shown in FIG. 4, each of two arms 459*a*, 459*b* may be connected to the respective diverting projections or doors 463*a*, 463*b* at one end and to a rod 455*a*, 455*b* at respective pivot 461*a*, 461*b* at the other end.

Each rod 455*a*, 455*b* may be connected to a portion of a respective actuator 451*a*, 451*b* such that (1) each actuator 451*a*, 451*b* can cause forward movement or extension of rod 455*a*, 455*b*, which causes opening of the respective diverting projections or doors 463*a*, 463*b* by pivoting of respective arm 459*a*, 459*b* at respective pivot 461*a*, 461*b* until an open position is reached as in FIG. 4, and (2) each actuator 451*a*, 451*b* can cause backward movement or retraction of rod 455*a*, 455*b*, which causes closing of the respective diverting projections or doors 463*a*, 463*b* by pivoting of respective arm 459*a*, 459*b* at respective pivot 461*a*, 461*b* until a closed position is reached as in FIG. 6. To help guide the linear movement of rod 455*a*, 455*b*, each rod 455*a*, 455*b* may be guided, constrained or confined by a respective guide tube 457*a*, 457*b*. The actuator may be powered by a variety of existing or additional power sources, such as a battery 454*a*, 454*b*. The actuator itself on each side may operate by utilizing electric, hydraulic and/or mechanical means and may be associated with a motor 453*a*, 453*b*. The actuator, power source (e.g., battery) and/or motor may be located or positioned in respective side portions, such as rear side portions 417*c*, 417*d*.

FIG. 5 shows a cross-sectional view through beam 400 as indicated by dotted line 490 in FIG. 4 viewed from the back of beam 400 with the diverting projections or doors 463*a*, 463*b* in the open position. In addition to the features described above, this figure shows another view of the chain drive mechanism for each auger pair. A left main auger sprocket 535*a* is shown attached to the shaft of the left main auger 407*a*, and a right main auger sprocket 535*b* is shown attached to the shaft of the right main auger 407*b*. Likewise, a left side auger sprocket 545*a* is shown attached to the shaft 411*a* of the left side auger 409*a*, and a right side auger sprocket 545*b* is shown attached to the shaft 411*b* of the right side auger 409*b*. A first chain drive 413*a* is wrapped around and engaged with the left main auger sprocket 535*a* and the left side auger sprocket 545*a* with the teeth of the sprockets meshed or interlocked with the holes of the chain, such as the holes in the links of the chain, such that the rotational movement of the left main auger 407a is transmitted and imparted to the left side auger 409a. Likewise, a second chain drive 413b is wrapped around and engaged with the right main auger sprocket 535b and the right side auger sprocket 545b with the teeth of the sprockets meshed or interlocked with the holes of the chain, such as the holes in the links of the chain, such that the rotational movement of the right main auger 407b is transmitted and imparted to the right side auger 409b.

As shown for example in FIG. 5, the main augers 407 may generally be larger in diameter than the side augers 409. For example, the shaft of the two main augers 407 may have a diameter of about 6 inches, and the flights of the main augers 525 may have a diameter of about 17 inches with a pitch of about 17 inches between adjacent flights. The shaft of the two side augers 409 may have a diameter of about 4 inches, and the flights of the side augers 540 may have a diameter of about 12 inches with a pitch of about 8 to about 10 inches between adjacent flights. To accommodate the differently sized augers, the main channel and the two side channels may have different cross-sectional dimensions. Indeed, the main channel may be taller and/or wider than each of the two side channels. For example, the two side channels 403 may have a height (top to bottom) of about 14 inches and/or a width (left to right) of about 14 inches, and the main channel 415 may have a height of about 18 inches to about 20 inches, such as about 18.5 inches and/or a width of about 42 inches to about 43 inches, such as about 42.5 inches. In addition, side portions 417 may be about 6 inches in width and/or about 18 inches to about 20 inches in height, such as about 18.5 inches in height similar to the main channel.

FIG. 6 shows another view of recovery beam 400 similar to FIG. 4 with the diverting projections or doors 463a, 463b on each side of the beam 400 in a closed position. As discussed above, the openings 401a, 401b may be long enough to receive the diverting projections or doors 463a, 463b such that diverting projections or doors 463a, 463b become flush with the sides of the beam when in the closed position. FIG. 6 further shows additional and optional latches 620a, 620b that may be used to secure the respective diverting projections or doors 463a, 463b when closed to keep them shut. These optional latches 620a, 620b may be coupled to the side of the beam by pivots 610a, 610b in front of the respective openings 401a, 401b so that the latches 620a, 620b may be rotated on the pivot to reversibly engage the respective diverting projections or doors 463a, 463b when closed to help secure their closure.

Figure 7:
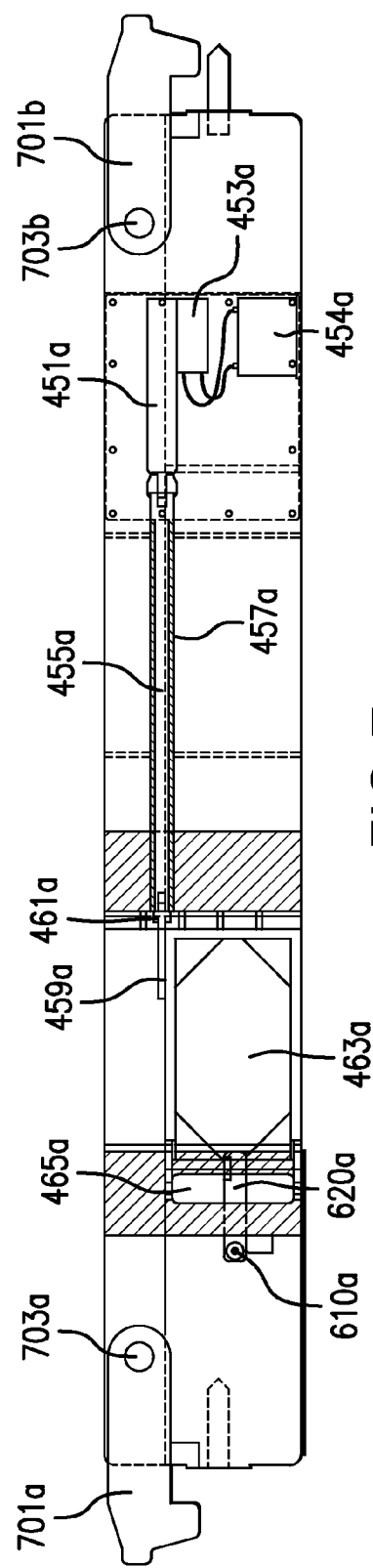
FIG. 7 is a left side view of second modified beam with side projection or door in a closed position.

FIG. 7 shows a left side view of recovery beam 400 with the diverting projection or door 463a in a closed position and recessed within opening 401a such that the diverting projection or door 463a is flush with left side of the beam 400. Again, optional latch 620a is shown rotated on pivot 610a into a position to hold or secure diverting projection or door 463a closed. FIG. 7 further shows additional attaching portions 701a, 701b that may be used to securely and reversibly attach, connect, etc., the beam 400 to an adjacent beam and/or cutter head segment in front and in back of it when inserted into the series of beams during use. FIG. 7 further shows another view of the system for driving, powering, controlling, etc., the opening and closing of the diverting projection or door 463a on the left side of beam 400. An access panel may also be provided on the side of beam to allow access to the components of this system.

According to another broad aspect of the present invention, methods are also provided for the use and operation of the modified push beams of the present invention separately or together as part of highwall mining operations according to the principles and features of the present invention described herein.

While the present invention has been disclosed with reference to certain embodiments, it will be apparent that modifications and variations are possible without departing from the spirit and scope of the invention as defined in the appended claims. Furthermore, it should be appreciated that all examples in the present disclosure, while illustrating embodiments of the invention, are provided as non-limiting examples and are, therefore, not to be taken as limiting the various aspects so illustrated. The present invention is intended to have the full scope defined by the language of the following claims, and equivalents thereof. Accordingly, the drawings and detailed description are to be regarded as illustrative and not as restrictive.

What is claimed is:

1. A rectangular recovery beam for highwall mining having a left side, a right side, a top, a bottom, a front end and a back end, comprising:
   a main channel spanning the full length of the recovery beam from the front end to the back end of the recovery beam, the main channel being mostly enclosed and configured to receive two main augers oriented lengthwise inside the main channel;
   a left side channel, the left side channel being closer to the left side of the recovery beam than the main channel, the left side channel being mostly enclosed, wherein the left side channel is at least partially separated from the main channel by a left partition wall, and wherein the left side channel is configured to receive a left side auger oriented lengthwise inside the left side channel;
   a right side channel, the right side channel being closer to the right side of the recovery beam than the main channel, the right side channel being mostly enclosed, wherein the right side channel is at least partially separated from the main channel by a right partition wall, wherein the right side channel is configured to receive a right side auger oriented lengthwise inside the right side channel;
   a left side opening in the left side of the recovery beam that is continuous with the left side channel;
   a right side opening in the right side of the recovery beam that is continuous with the right side channel;
   a left inner opening in the left side of the main channel between the left side channel and the main channel; and
   a right inner opening in the right side of the main channel between the right side channel and the main channel,
   wherein the rectangular recovery beam has its longest dimension from the front end to the back end of the recovery beam.

2. The recovery beam of claim 1, further comprising:
   a V-shaped scraper on the underside of the bottom of the recovery beam, the V-shaped scraper having a leading point near the front end of the recovery beam and a left diverting side and a right diverting side,
   wherein the left diverting side is angled back toward a position on the left side of the beam at or near the front of the left side opening, and
   wherein the right diverting side is angled back toward a position on the right side of the beam at or near the front of the right side opening.
   wherein the rectangular recovery beam has its longest dimension from the front end to the back end of the recovery beam wherein the recovery beam is mostly enclosed.

3. The recovery beam of claim 1,
wherein the left inner opening is closer to the back end of the recovery beam than the left side opening, and
wherein the right inner opening is closer to the back end of the recovery beam than the right side opening.

4. The recovery beam of claim 1,
wherein each of the top, bottom, front end and back end of the left side channel is bounded by one or more walls, panels or plates, and
wherein each of the top, bottom, front end and back end of the right side channel is bounded by one or more walls, panels or plates.

5. The recovery beam of claim 1,
wherein the left side channel is at least partially separated from the exterior of the recovery beam by a left outer wall, the left outer wall forming at least part of the left side of the recovery beam, and
wherein the right side channel is at least partially separated from the exterior of the recovery beam by a right outer wall, the right outer wall forming at least part of the right side of the recovery beam.

6. The recovery beam of claim 5,
wherein the left side channel is at least partially separated from the exterior of the recovery beam by a left side portion, the left outer wall foaming at least part of the outer side of the left side portion, and
wherein the right side channel is at least partially separated from the exterior of the recovery beam by a right side portion, the right outer wall forming at least part of the outer side of the right side portion.

7. The recovery beam of claim 1,
wherein the left side channel and the right side channel each have a lengthwise dimension and a width dimension, the width dimension being perpendicular to the lengthwise dimension,
wherein the lengthwise dimension of the left side channel and the right side channel is greater than the width dimension of the respective side channel.

8. The recovery beam of claim 7,
wherein the lengthwise dimension of the left side channel is defined as the distance between the front end of the left side channel bounded by a left front plate and the back end of the left side channel bounded by a first angled panel, the width of the left side channel defined as the distance between a left side portion and a left partition wall, and
wherein the lengthwise dimension of the right side channel is defined as the distance between the front end of the right side channel bounded by a right front plate and the back end of the right side channel bounded by a second angled panel, the width of the right side channel defined as the distance between a right side portion and a right partition wall.

9. The recovery beam of claim 1, further comprising:
a left diverting projection having its proximal end attached at or near the back of the left side opening and having its distal end extending outward at a forward angle; and
a right diverting projection having its proximal end attached at or near the back of the right side opening and having its distal end extending outward at a forward angle.

10. The recovery beam of claim 9,
wherein the proximal end of the left diverting projection is attached to the left side of the beam by a first hinge, such that the left diverting projection can swing between an open position and a closed positions, and
wherein the proximal end of the right diverting projection is attached to the right side of the beam by a second hinge, such that the right diverting projection can swing between an open position and a closed position.

11. The recovery beam of claim 10, further comprising:
a left actuator; a left rod; and a left arm, wherein the left arm is pivotally attached to the left rod at one end of the left arm and to the left diverting projection at the other end of the left arm, such that the left diverting projection is moved toward the closed position when the left rod is retracted by the left actuator and toward the open position when the right rod is extended by the left actuator; and
a right actuator; a right rod; and a right aim, wherein the right arm is pivotally attached to the right rod at one of end of the right arm and to the right diverting projection at the other end of the right arm, such that the right diverting projection is moved toward the closed position when the right rod is retracted by the right actuator and toward the open position when the right rod is extended by the right actuator.

12. The recovery beam of claim 1, further comprising:
a left main auger; and
a right main auger,
wherein the left main auger and the right main auger are each positioned inside the main channel with the longitudinal and rotational axes of the left main auger and the right main auger oriented lengthwise, and wherein the left main auger and the right main auger each span most or all of the length of the main channel.

13. The recovery beam of claim 2, further comprising:
the left side auger positioned inside the left side channel with the longitudinal and rotational axis of the left side auger oriented lengthwise; and
the right side auger positioned inside the right side channel with the longitudinal and rotational axis of the right side auger oriented lengthwise.

14. The recovery beam of claim 13,
wherein the left main auger is coupled to the left side auger, such that rotation of the left main auger causes the left side auger to rotate, and
wherein the right main auger is coupled to the right side auger, such that rotation of the right main auger causes the right side auger to rotate.

15. The recovery beam of claim 14, wherein rotation of the left main auger causes the left side auger to rotate in the same direction, and wherein rotation of the right main auger causes the right side to rotate in the same direction.

16. The recovery beam of claim 14,
wherein coupling of the left main auger to the left side auger comprises a first drive chain engaged with a left main auger sprocket and a left side auger sprocket, the left main auger sprocket attached to the shaft of the left main auger and the left side auger sprocket attached to the shaft of the left side auger, and
wherein coupling of the right main auger to the right side auger comprises a second drive chain engaged with a right main auger sprocket and a right side auger sprocket, the right main auger sprocket attached to the shaft of the right main auger and the right side auger sprocket attached to the shaft of the right side auger.

17. The recovery beam of claim 13,
wherein the longitudinal and rotational axis of the left side auger is approximately parallel to the left side of the recovery beam, and wherein the longitudinal and rotational axis of the right side auger is approximately parallel to the right side of the recovery beam.

18. The recovery beam of claim 13, wherein the flights of each of the main augers are larger in diameter than the flights of each of the side augers.

19. The recovery beam of claim 13,
wherein the left side auger is inserted through a hole in a left front plate and a hole in a left rear plate, the left front plate and the left rear plate being in a plane perpendicular to the longitudinal axis of the left side auger, and
wherein the right side auger is inserted through a hole in a right front plate and a hole in a right rear plate, the right front plate and the right rear plate being in a plane perpendicular to the longitudinal axis of the right side auger.

20. The recovery beam of claim 19, wherein the front end of the left side channel is bounded by the left front plate, and wherein the front end of the right side channel is bounded by the right front plate.

21. The recovery beam of claim 13, wherein the flights of the left side auger and the left main auger have the same handedness, and wherein the flights of the right side auger and the right main auger have the same handedness.

22. The recovery beam of claim 21, wherein the left main auger is a right-handed auger and the right main auger is a left-handed auger.

23. The recovery beam of claim 13,
wherein the back end of the left side channel is bounded by a first angled panel spanning from the back of the left inner opening toward the left side of the recovery beam, the first angled panel having a left side edge and a left inner edge with the left side edge being closer to the left side of the recovery beam than the left inner edge and the left inner edge being closer to the main channel than the left side edge,
wherein the first angled panel is oriented such that the left side edge of the first angled panel is closer to the front end of the recovery beam than the left inner edge of the first angled panel, and
wherein the back end of the right side channel is bounded by a second angled panel spanning from the back of the right inner opening toward the right side of the recovery beam, the second angled panel having a right side edge and a right inner edge with the right side edge being closer to the right side of the recovery beam than the right inner edge and the right inner edge being closer to the main channel than the right side edge,
wherein the second angled panel is oriented such that the right side edge of the second angled panel is closer to the front of the recovery beam than the right inner edge of the second angled panel.

24. The recovery beam of claim 13,
wherein the longitudinal and rotational axis of the left side auger is approximately parallel to the longitudinal and rotational axis of the left main auger, and
wherein the longitudinal and rotational axis of the right side auger is approximately parallel to the longitudinal and rotational axis of the right main auger.

25. A rectangular beam for diverting coal to the sides of a mine during highwall mining having a left side, a right side, a top, a bottom, a front end and a back end, comprising:
a main channel spanning the full length of the beam from the front end to the back end of the beam, the main channel being mostly enclosed;
a left main auger;
a right main auger; and
at least one V-shaped scraper on the underside of the bottom of the recovery beam,
wherein the left main auger and the right main auger are each oriented lengthwise inside the main channel and spanning most or all of the length of the main channel,
wherein the at least one V-shaped scraper has a leading point, a left diverting side and a right diverting side, wherein the left diverting side is angled back from the leading point toward a left side position on the left side of the beam and the right diverting side is angled back from the leading point toward a right side position on the right side of the beam,
wherein the respective portions of each of the left diverting side and the right diverting side closest to the left side position and the right side position are closer to the back end of the beam than is the leading point of the at least one V-shaped scraper, and
wherein the rectangular recovery beam has its longest dimension from the front end to the back end of the beam.

26. The rectangular beam of claim 25, wherein the thickness of each of the left diverting side and the right diverting side of the at least one V-shaped scraper is from about 0.25 inch to about 1.5 inches.

27. A method for recovering additional coal during highwall mining, comprising:
(a) providing a rectangular recovery beam for highwall mining having a left side, a right side, a top, a bottom, a front end and a back end, comprising:
a main channel spanning the full length of the recovery beam from the front end to the back end of the recovery beam, the main channel of the recovery beam being mostly enclosed;
at least two main augers including a left main auger and a right main auger, wherein the left main auger and the right main auger are each positioned inside the main channel of the recovery beam with the longitudinal and rotational axes of each of the left main auger and the right main auger oriented lengthwise, wherein each of the left main auger and the right main auger spans most or all of the length of the main channel of the recovery beam;
a left side channel, the left side channel being closer to the left side of the recovery beam than the main channel, the left side channel being mostly enclosed, wherein the left side channel is at least partially separated from the main channel of the recovery beam by a left partition wall;
a left side auger positioned inside the left side channel of the recovery beam with the longitudinal and rotational axis of the left side auger oriented lengthwise;
a right side channel, the right side channel being closer to the right side of the recovery beam than the main channel, the right side channel being mostly enclosed, wherein the side channel is at least partially separated from main channel of the recovery beam by a right partition wall;
a right side auger positioned inside the right side channel of the recovery beam with the longitudinal and rotational axis of the right side auger oriented lengthwise;
a left side opening in the left side of the recovery beam that is continuous with the left side channel;
a right side opening in the right side of the recovery beam that is continuous with the right side channel;
a left inner opening in the left side of the main channel of the recovery beam between the left side channel and the main channel; and a right inner opening in the right side of the main channel of the recovery beam between the right side channel and the main channel, wherein the recovery beam has its longest dimension from the front end to the back end of the recovery beam; and wherein the left main auger and the left side augers of the recovery beam are right-handed augers and the right main auger and the right side auger of the recovery beam are left-handed augers;

(b) rotating the left main auger of the recovery beam and the right main auger of the recovery beam, the main auger being rotated clockwise and the right main auger being rotated counter-clockwise; and (c) causing the left side auger of the recovery beam and the right side auger of the recovery beam to rotate by the left side auger being rotationally coupled to the left main auger of the recovery beam and the right side auger being rotationally coupled to the right main auger of the recovery beam.

28. The method of claim 27, further comprising:

(d) inserting the recovery beam provided in step (a) in a series of push beams of a highwall miner during operation of the highwall miner behind a cutter head segment, wherein step (d) is performed prior to step (b).

29. The method of claim 28, further comprising:

(i) capturing residual coal on the sides of the mine by:
   diverting residual coal through the left side opening of the recovery beam and into the left side channel of the recovery beam, and
   diverting residual coal through the right side opening of the recovery beam and into the right side channel of the recovery beam; and (j) moving the captured residual coal in the left side channel and the right side channel of the recovery beam toward the respective back end of the left side channel and the right side channel and then into the main channel of the recovery beam through the left inner opening and the right inner opening, respectively, wherein the captured residual coal in the left side channel of the recovery beam is at least partly moved toward the back end of the left side channel and into the main channel during step (j) by rotation of the left side auger in step (c), wherein the captured residual coal in the right side channel is at least partly moved toward the back end of the right side channel and into the main channel during step (j) by rotation of the right side auger in step (c); and (k) moving the captured residual coal in the main channel of the recovery beam toward the back end of the main channel of the recovery beam at least partly by rotation of the main augers during step (b), wherein steps (b) and step (c) occur simultaneously.

30. The method of claim 27, further comprising:

(e) providing a rectangular second beam for diverting coal to the sides of a mine during highwall mining having a left side, a right side, a top, a bottom, a front end and a back end, comprising:

a main channel spanning the full length of the second beam from the front end to the back end of the second beam, the main channel of the second beam being mostly enclosed;

at least two main augers including a left main auger and a right main auger, wherein the left main auger and the right main auger are each oriented lengthwise inside the main channel of the second beam and spanning most or all of the length of the main channel of the second beam; and at least one V-shaped scraper on the underside of the bottom of the second beam, the at least one V-shaped scraper having a leading point, a left diverting side and a right diverting side, wherein the left diverting side is angled back from the leading point toward a left side position on the left side of the second beam and the right diverting side is angled back from the leading point toward a right side position on the right side of the second beam, wherein the respective portions of each of the left diverting side and the right diverting side of the at least one V-shaped scraper closest to the left side position and the right side position of the second beam are closer to the back end of the second beam than is the leading point of the at least one V-shaped scraper, and wherein the second beam has its longest dimension from the front end to the back end of the second beam;

(f) inserting the second beam provided in step (e) in a series of push beams of a highwall miner during operation of the highwall miner behind a cutter head segment, wherein step (f) is performed prior to step (b); and (g) inserting the recovery beam provided in step (a) in the series of push beams of the highwall miner during operation of the highwall miner behind a cutter head segment, wherein step (g) is performed prior to step (b).

31. The method of claim 30, wherein step (f) is performed prior to step (g), such that the recovery beam is inserted behind the second beam in the series of push beams in step (g).

32. The method of claim 31, wherein the second beam is inserted directly behind the cutter head segment of the highwall miner in step (f).

33. The method of claim 31, wherein the recovery beam is inserted directly behind the second beam in the series of push beams in step (g).

* * * * *